United States Patent
Stetson

(10) Patent No.: US 9,936,111 B1
(45) Date of Patent: Apr. 3, 2018

(54) ARTICULATING IMAGING MODULE FOR ELECTRONIC DEVICES

(71) Applicant: GOOGLE LLC, Mountain View, CA (US)

(72) Inventor: Philip Sean Stetson, Wexford, PA (US)

(73) Assignee: GOOGLE LLC, Mountain View, CA (US)

(*) Notice: Subject to any disclaimer, the term of this patent is extended or adjusted under 35 U.S.C. 154(b) by 5 days.

(21) Appl. No.: 14/735,848

(22) Filed: Jun. 10, 2015

(51) Int. Cl.
*H04N 5/225* (2006.01)
*H04N 5/232* (2006.01)

(52) U.S. Cl.
CPC ......... *H04N 5/2254* (2013.01); *H04N 5/2252* (2013.01); *H04N 5/23293* (2013.01)

(58) Field of Classification Search
CPC ............ H04M 1/0264; H04M 1/0214; H04M 1/0235; H04M 2250/20; H04N 5/2252; H04N 5/2254; H04N 7/142; H04N 2007/145; G02B 15/10; G02B 13/001
See application file for complete search history.

(56) References Cited

U.S. PATENT DOCUMENTS

| | | | |
|---|---|---|---|
| 3,913,116 A * | 10/1975 | Kastner | G03B 19/18 352/243 |
| 5,587,765 A * | 12/1996 | Goto | G03B 7/09979 396/234 |
| 6,041,195 A * | 3/2000 | Honda | G03B 17/48 348/64 |
| 6,101,339 A * | 8/2000 | Miki | G03B 7/26 348/372 |
| 6,480,724 B1 | 11/2002 | Erkkila et al. | |
| 7,515,709 B2 | 4/2009 | Richter | |
| 7,618,260 B2 | 11/2009 | Daniel et al. | |
| 8,010,154 B2 * | 8/2011 | Chambers | H04M 1/0264 455/556.1 |
| 8,086,269 B2 | 12/2011 | Wang | |
| 8,380,252 B2 | 2/2013 | Ijas et al. | |
| 8,483,758 B2 | 7/2013 | Huang | |
| 8,503,876 B2 * | 8/2013 | Schmidt | G03B 17/565 396/383 |
| 8,743,194 B2 * | 6/2014 | Fletcher | G02B 21/0008 348/61 |

(Continued)

OTHER PUBLICATIONS cnet.com, "Samsung Upstage Review:," (Jun. 27, 2007). Retrieved from the Internet on Jun. 23, 2015: http://www.cnet.com/products/samsung-upstage/.

(Continued)

*Primary Examiner* — Pritham Prabhakher
(74) *Attorney, Agent, or Firm* — Marshall, Gerstein & Borun LLP

(57) ABSTRACT

Embodiments are provided for an imaging module configured to interface with an electronic device. According to certain aspects, the imaging module includes a support section that may secure to the electronic device and a body section that may extend beyond one or more dimensions that define the electronic device. The body section houses or secures various components that enable digital image capture, including one or more lenses, a viewfinder, and an image sensor. The body section may also articulate or rotate about an axis to increase versatility of the imaging module.

12 Claims, 6 Drawing Sheets

(56) References Cited

U.S. PATENT DOCUMENTS

| | | | | |
|---|---|---|---|---|
| 8,902,315 B2* | 12/2014 | Fisher | H04M 1/6066 | 348/164 |
| 9,007,522 B1* | 4/2015 | O'Neill | G02B 7/14 | 348/375 |
| 9,031,610 B2* | 5/2015 | Kulas | H04M 1/0254 | 455/556.1 |
| 9,335,509 B2* | 5/2016 | O'Neill | G02B 7/14 | |
| 9,357,109 B2* | 5/2016 | Hyers | H04N 5/2252 | |
| 9,503,625 B2* | 11/2016 | Oliveira | H04N 5/232 | |
| 9,596,392 B2* | 3/2017 | Takagi | H04N 5/2254 | |
| 2002/0102946 A1 | 8/2002 | SanGiovanni | | |
| 2002/0155864 A1 | 10/2002 | Wang | | |
| 2006/0014563 A1* | 1/2006 | Cheng | H04M 1/0254 | 455/557 |
| 2007/0166027 A1* | 7/2007 | Misawa | G03B 17/02 | 396/529 |
| 2007/0273752 A1* | 11/2007 | Chambers | H04M 1/0264 | 348/14.02 |
| 2007/0279481 A1* | 12/2007 | Chambers | H04N 5/232 | 348/14.01 |
| 2007/0280677 A1* | 12/2007 | Drake | G02B 7/02 | 396/429 |
| 2011/0267432 A1* | 11/2011 | Kumakura | H04N 5/2252 | 348/47 |
| 2012/0236425 A1* | 9/2012 | O'Neill | G02B 7/14 | 359/827 |
| 2012/0282977 A1* | 11/2012 | Haleluk | H04B 1/3888 | 455/556.1 |
| 2012/0320340 A1* | 12/2012 | Coleman, III | A61B 3/14 | 351/208 |
| 2013/0150122 A1* | 6/2013 | Kulas | H04M 1/0254 | 455/556.1 |
| 2013/0178245 A1* | 7/2013 | Kulas | H04M 1/0264 | 455/556.1 |
| 2013/0209954 A1* | 8/2013 | Prakash | A61B 1/0005 | 433/29 |
| 2013/0222668 A1* | 8/2013 | Anderson | H04N 5/2251 | 348/333.08 |
| 2013/0231065 A1* | 9/2013 | Hayashi | H04M 1/7253 | 455/73 |
| 2013/0330069 A1* | 12/2013 | PeQueen | G03B 13/02 | 396/544 |
| 2013/0331148 A1* | 12/2013 | Brough | G06F 1/1632 | 455/557 |
| 2014/0300809 A1* | 10/2014 | Oliveira | H04N 5/232 | 348/376 |
| 2014/0313377 A1* | 10/2014 | Hampton | H05K 5/0217 | 348/241 |
| 2014/0320987 A1* | 10/2014 | O'Neill | G02B 7/14 | 359/821 |
| 2015/0116699 A1* | 4/2015 | Meek | G01M 11/31 | 356/73.1 |
| 2015/0168808 A1* | 6/2015 | PeQueen | G03B 13/02 | 348/341 |
| 2015/0334306 A1* | 11/2015 | Sato | H04N 5/23293 | 348/211.8 |

OTHER PUBLICATIONS phonebloks.com, "Phonebloks," (2015). Retrieved from the Internet on Jun. 23, 2015:https://phonebloks.com/en.

pocket-lint.com, "Fonkraft: Modular smartphone with 4,100mAh battery, 20MP camera, 192kHz audio and more is here," (Apr. 28, 2015). Retrieved from the Internet on Jun. 23, 2015: http://www.pocket-lint.com/news/133703-fonkraft-modular-smartphone-with-4-100mah-battery-20mp-camera-192khz-audio-and-more-is-here.

sony.net, "Lens Style Camera DSC-QX100 go smarter Be Moved," (2015). Retrieved from the Internet on Jun. 23, 2015: http://www.sony.net/Products/di/en-gb/products/ec8t/.

sony.net, "Lens Style Camera DSC-QX30 go smarter Be Moved," (2015). Retrieved from the Internet on Jun. 23, 2015: http://www.sony.net/Products/di/en-gb/products/voa7/.

Google Inc., "Project Ara Module Developers Kit (MDK)," (2014). Retrieved from the Internet at: URL:http://www.industrie.com/it/mediatheque/3/1/6/000012613.pdf>.

* cited by examiner

ARTICULATING IMAGING MODULE FOR ELECTRONIC DEVICES

FIELD

This application generally relates to imaging functionalities of electronic devices. In particular, the application relates to an articulating imaging module with digital image capture capabilities that may be removably secured to electronic devices.

BACKGROUND

Portable electronic devices such as smart phones and tablet devices are becoming more ubiquitous as underlying technology and device capability improves. Generally, with improved technology comes more portable and advanced devices. These devices incorporate numerous components that support various device functions and applications. For example, current smart phones include components that support various types of wireless communication, image and video capture, audio and video playback, data storage, and/or the like.

To maintain portability, electronic devices have dimensions that are generally constrained to be smaller. As a result, the sizes of the device components are also constrained, which impacts device and component performance. For example, smart phone cameras are limited in the size of image sensors and the physical size of lenses, which negatively affects image quality and general camera versatility. Portable electronic devices also lack viewfinders because, among other reasons, display screens of the devices may support a live preview function. However, this forces the users to hold the device at an outstretched position, which causes the cameras to be more susceptible to camera shake. While some electronic devices contemplate incorporating modular camera components, these modular camera components are bulky and unwieldy, which is generally not desirable in consumer devices.

There is therefore an opportunity for modular imaging components that are equipped with more advanced features but are capable of conforming to the physical dimensions of the supporting electronic devices.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed embodiments, and explain various principles and advantages of those embodiments.

DETAILED DESCRIPTION

Figure 1:
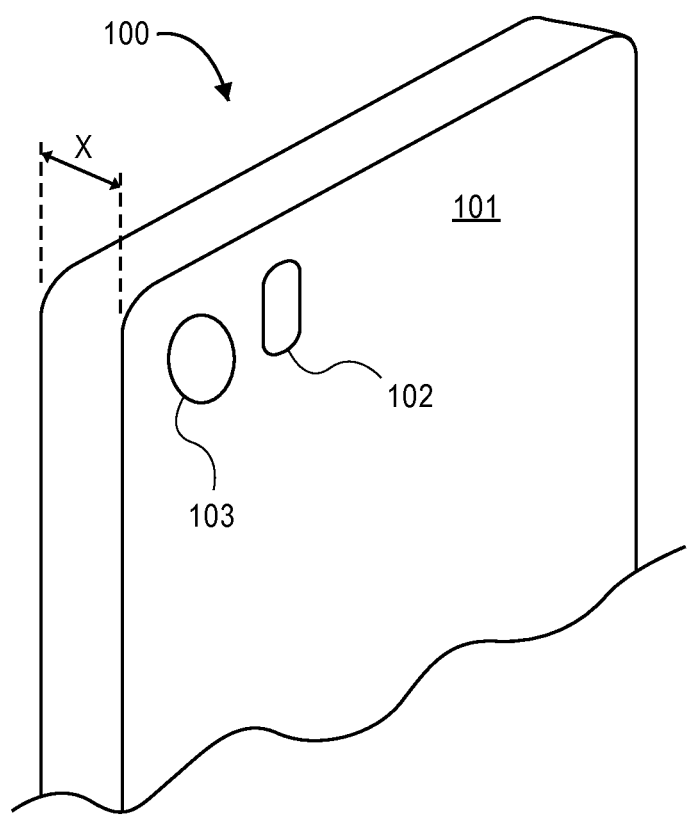
FIG. 1 depicts a conventional electronic device.

Existing portable electronic devices such as smart phones and tablet devices are often equipped with built-in camera or imaging modules which are configured to capture digital image data in the form of images and videos. A user of the electronic device may control operation of an imaging module via a user interface, such as a touchscreen and a set of hardware and/or software buttons. However, consumer expectations with respect to the thickness (and other dimensions) of electronic devices have resulted in current electronic devices with increasingly limited thickness. For example, current smart phones typically measure less than 10 mm thick, and in some cases may be as small as 7 mm or less.

These physical constraints limit the configuration of the imaging modules, which impacts the performance of the imaging modules. In particular, the size of the image sensor and the focal length of the lens are limited by the thickness dimension of the electronic device. Additionally, current portable devices do not support viewfinders but instead offer a live-preview feature where a display screen displays a preview of image data captured by an imaging module. However, the resulting ergonomics of the electronic device force users to outstretch their arms to capture images or videos, which causes the imaging module to be more susceptible to camera shake, which in turn results in lower image quality. For example, camera shake may result in lower image quality in low light situations as compared to image quality from still cameras.

The embodiments described herein provide for an imaging module that may removably secure to a support housing of an electronic device. The imaging module, when secured to the support housing, may extend beyond the framework of the support housing in one or more dimensions, thus enabling the imaging module to not be constrained to the dimensions of the support housing. The imaging module may also be configured to articulate among various positions, such as by rotating at least partially about an axis. According to embodiments, the imaging module may include a lens of variable focal length, including individual lens elements that are configured as a zoom lens, as well as an optical or electronic viewfinder that enables a user to view light that passes through the lens.

The embodiments as discussed herein offer benefits to users of the electronic devices. In particular, by including a viewfinder, the imaging module supports improved device ergonomics with reduced camera shake, features that are especially appealing to photography enthusiasts. Further, because the imaging module is modular, a user may effectively and efficiently swap the imaging module into and out of the support housing, such as in situations in which the user wishes to use an imaging module having different focal lengths. Additionally, by supporting articulating movement, the imaging module may be repositioned to enable increased versatility of the imaging module as well as greater portability of the electronic devices. It should be appreciated that other advantages and benefits are envisioned.

The systems and methods discussed herein therefore address a challenge that is particular to electronic devices. In particular, the challenge relates to imaging modules that are limited by the physical constraints of the electronic devices. This is particularly apparent when a user wishes to capture images at varying focal lengths and with minimal camera shake. Instead of being limited by the thickness of the supporting electronic device, the imaging modules of the present embodiments support a modular and articulating body component that extends beyond one or more dimensions of a support housing, thus being able to support lenses of varying focal lengths as well as a built-in viewfinder. Accordingly, because the configurations include an imaging module securing to and interfacing with an electronic device, the systems and methods are necessarily rooted in computer technology in order to overcome the noted shortcomings that specifically arise in the realm of electronic devices.

FIG. 1 depicts a conventional electronic device 100, such as a smart phone. The electronic device 100 may include a housing 101 that may contain many hardware and software components that support various functionalities and applications of the electronic device 100. In one particular example, the housing 101 contains an imaging module or camera that may utilize a lens 103 and flash component 102 during operation, along with other components such as a lens cover, a shutter, and an image sensor. The components of the imaging module, though, are constrained to the physical dimensions of the housing 101 as well as by other components contained within the housing 101.

As illustrated in FIG. 1, the electronic device is defined by a set of dimensions, including a thickness dimension "x". Accordingly, the imaging module (including the lens 103, the flash component 102, and any other components) are constrained to at least the thickness dimension "x" as well as by other components contained within the housing 101. For example, the electronic device 100 may include a display screen that is located opposite from the imaging module. In this regard, both the size of the image sensor and the focal length of the lens 103 are limited, among other impediments, which negatively affects performance of the imaging module, such as lower image quality.

While various components such as the imaging module may be designed to protrude from the housing 101, these components often extend from the housing 101 in one or more directions and are rigid in their configurations. The existing components, therefore, may be undesirable for users as they impact portability and results in the electronic device 100 being bulky and unwieldy.

Figure 2A:
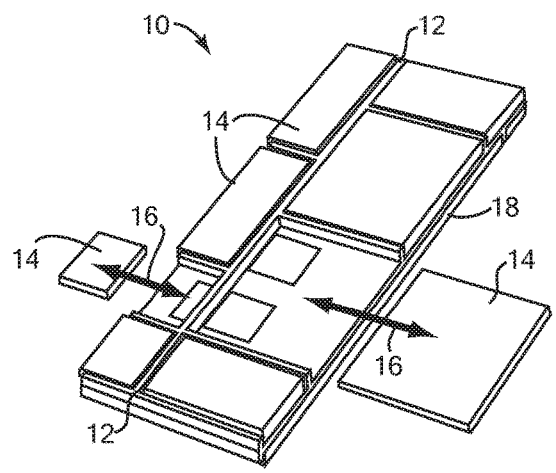
FIG. 2A depicts an example electronic device including hardware modules configured to connect thereto, in accordance with some embodiments.

FIG. 2A depicts an example electronic device 10 configured to removably secure a set of modules. The electronic device 10 may be any type of portable electronic device, for example, a notebook computer, a mobile phone, a Personal Digital Assistant (PDA), a smart phone, a tablet computer, a multimedia player, an MP3 or MP4 player, a digital or analog broadcast receiver, a remote controller, or any other electronic apparatus. The electronic device 10 may include various electronic and mechanical features and components capable of supporting a variety of functionalities and applications, including phone and video calls, data communication, general computing and processing data, audio input and output, graphical display, sensing environmental conditions, sensing interactions with users, recording data, generating notifications, maintaining scheduling data, and/or the like.

As illustrated in FIG. 2A, the electronic device 10 may include a support housing 12 that may be configured to removably secure a set of modules 14 thereto. In particular, a user may manually attach the set of modules 14 to or remove the set of modules 14 from the support housing 12.

The set of modules 14 may be electrically and/or physically connected to the support housing 12 using any of a variety of connection components, such as magnetic connectors (e.g., electro-permanent magnets (EPMs)), capacitive connectors, optical connectors, or other electrical connections; physical male/female connectors or ports (e.g., ribs and recesses); and/or other fastening or connecting components.

Some implementations enable the set of modules 14 to be locked in place to the support housing 12 at a particular position within the support housing 12. For example, the set of modules 14 may be locked to the support housing 12 using a hardware locking mechanism such as a latch. According to embodiments, a power source (e.g., a battery) may be included in each of the set of modules 14 to power its own operation. The set of modules 14 may additionally or alternatively be powered by a power source provided in other modules 14 or located within the electronic device 10, such as a battery. In one implementation, the connection components may also supply power from a power source of the electronic device 10 to the set of modules 14.

The support housing 12 may include a set of ports, receptacles, or the like (generally, a set of ports) spaced at various positions or locations, where the set of ports may be physically separated by a set of ribs and/or a set of spines that may protrude from the support housing 12. The set of ports may be configured to receive and removably secure the set of modules 14 via corresponding connector components. For example, as illustrated in FIG. 1, some of the set of modules 14 may be slid in or out of some ports of the support housing 12 as shown by arrows 16. The set of ports may be located at various positions of the support housing 12, and may be different sizes and/or include different types and/or amounts of connector components. Similarly, the set of modules 14 may be of different sizes and shapes, and may include various types and amounts of connector components.

Accordingly, various of the set of modules 14 may be compatible with some of the ports and incompatible with others of the ports. Therefore, the user may interchange some of the modules 14 in various correspondingly-sized ports of the support housing 12 if those modules 14 are physically similar in dimensions and/or include the same type and/or amount of connector components. The interchangeability of the set of modules 14 enables the electronic device 10 to achieve different physical layouts.

According to embodiments, each of the set of modules 14 may include electronic components that enable or are associated with one or more functions. Specifically, these one or more functions may contribute to or supplement operation of the electronic device 10 when the corresponding module 14 is secured to the electronic device 10 via the support housing 12. In some implementations, some of the modules 14 may include components that are used by various functions or applications of the electronic device 10. For example, the module 14 may include a lens and image sensor that is used by a camera application supported by the electronic device 10; or a display screen module 18 may include a display screen that is used by a video playback application executable by the electronic device 10. In other implementations, some of the modules 14 may provide functionality that contributes to operation of the electronic device 10. For example, various of the modules 14 may add memory to the total memory of the electronic device 10, processing capability to the total processing capability of the electronic device 10, or battery power to an overall power capability of the electronic device 10.

It should be appreciated that a variety of functions and applications associated with the modules 14 are envisioned. In one implementation, the modules 14 may be associated with communication capabilities of the electronic device 10. For example, one of the modules 14 may be a subscriber identity module (SIM) module that may include a socket (or other receptacle) to interface with a SIM card inserted in the socket, where the SIM card may store subscriber identity information for a phone carrier or other service carrier. Accordingly, different SIM cards may be inserted into or removed from the SIM module to enable different subscribers or accounts to use the electronic device 10, and/or to enable retrieval of stored personal data of a user, such as contacts and/or other data. The SIM module may also include a physical slider or switch to enable a user to select different subscriber services that may be linked to the SIM card. For example, different switch positions may correspond to different options to send/receive voice calls only (and not data), send/receive data only (such as via a data plan), or disallow phone service if roaming charges on the device would be incurred.

In some implementations, multiple of the set of modules 14 may be fastened or connected to each other via electrical and/or physical connectors. For example, magnetic connections or connectors may provide an attractive force between or among modules 14 to attach them securely to each other, but still enable a user to readily pull apart the modules 14; or physical connectors may provide physical engagement between or among some of the modules 14. Some implementations may enable wireless communication (e.g., short-range communication such as RF signals) between the modules 14 and the support housing 12, or between the modules 14 themselves. Some of the modules 14 may also be positioned in the ports of the support housing 12 so those modules 14 are adjacent to each other.

In one example implementation, the modules 14 may be display modules that each includes a display screen on its surface that may support graphical display output. The display screen on each module may extend to one or more edges of the module, and the module may include a connector to be linked directly to another module at a corresponding edge. Accordingly, each display module may be connected to another display module at corresponding edges to cause the display screens to be positioned adjacent to each other and to form a combined display screen having a larger area. A display controller of the electronic device 10 may manage the content that is displayed on the adjacent display modules such that the combined display area of the adjacent display modules acts as a single large screen, or as multiple screens defined arbitrarily within the combined display area. Some implementations enable a display screen area to be extended in horizontal and/or vertical directions of the display modules.

According to embodiments, the electronic device 10 may be physically implemented according to various configurations and may support multiple ways for the modules 14 to connect to the support housing 12. In particular, the electronic device 10 may include one or more layers, where each layer may define a plane of the support housing 12 and that may removably secure multiple of the modules 14. In some implementations in which the electronic device 10 includes multiple layers, each layer may be aligned parallel to the other layers.

Figure 2B:
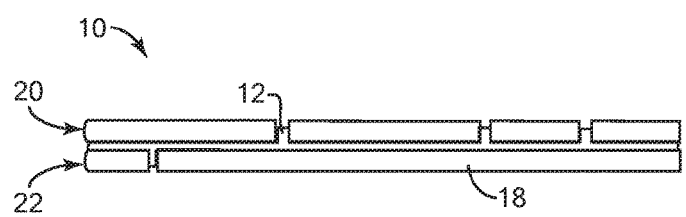
FIGS. 2B and 2C depict various views of an example modular electronic device, in accordance with some embodiments.

FIG. 2B depicts a side view of the electronic device 10 described with respect to FIG. 2A. The electronic device 10 depicted in FIG. 2B includes two layers: a rear or back layer 20 (which is shown facing up in FIG. 2A) and a front layer 22 (which is shown facing down in FIG. 2A). The rear layer 20 may removably secure a first set of modules that may be arranged within a plane and the front layer 22 may removably secure a second set of modules that may be arranged within another plane, where the rear layer 20 and the front layer 22 may be aligned parallel to each other.

The support housing 12 may accordingly include a first side associated with the rear layer 20 and a second side associated with the front layer 22, where the first side and the second side may include ports having the same or different amount, type, and size to respectively removably secure the first set of modules and the second set of modules. For example, the front layer 22 may face the user during normal use of the electronic device 10 and may accordingly include a larger port for securing the display screen module 18 that may be larger than other modules. It should be appreciated that the electronic device 10 may include fewer or more layers.

Figure 2C:
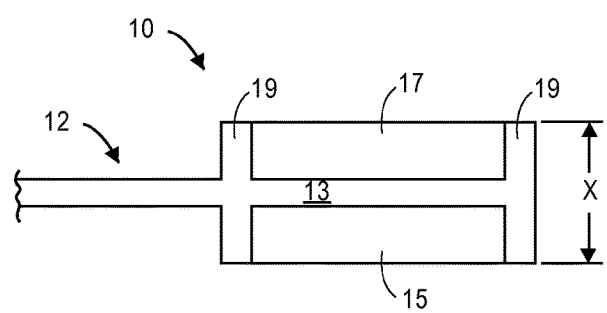

FIG. 2C is a cross-section view of the electronic device 10 described with respect to FIG. 2A. The electronic device 10 may include the support housing 12 that may be defined by a set of ribs 19 (and/or a set of spines (not shown in FIG. 2C)) as well as a center plate 13, which is depicted as the horizontal component of the support housing 12 in FIG. 2C. Generally, an overall thickness "x" of the electronic device 10 is defined by a thickness of the center plate 13, a thickness of a front module 17, and a thickness of a rear or back module 15. In one implementation, each of the center plate 13, the front module 17, and the rear module 15 may have approximately the same thickness (e.g., 4 mm, resulting in a total thickness "x" of 12 mm). However, it should be appreciated that the respective thicknesses may vary. As discussed herein, each of the front module 17 and the rear module 15 may removably secure to respective ports of the support housing 12, and specifically to respective ports of a front surface and a rear surface of the center plate 13 of the support housing 12.

Although the modules as described herein are referenced by the terms "front" and "rear," it should be appreciated that the modules are not limited to secure to a particular "front" or "rear" side of the corresponding electronic device. Accordingly, any "front" module may secure to a "rear" side of the electronic device, and any "rear" module may secure to a "front" side of the electronic device. Indeed, the "front" modules as well as a "front" side of the electronic device, and the "rear" modules as well as a "rear" side of the electronic device may be understood to not have a relative direction or side, and may generally be thought of as a "first" module and "first" side, and "second" module and "second" side.

Figures 3A, 3C:
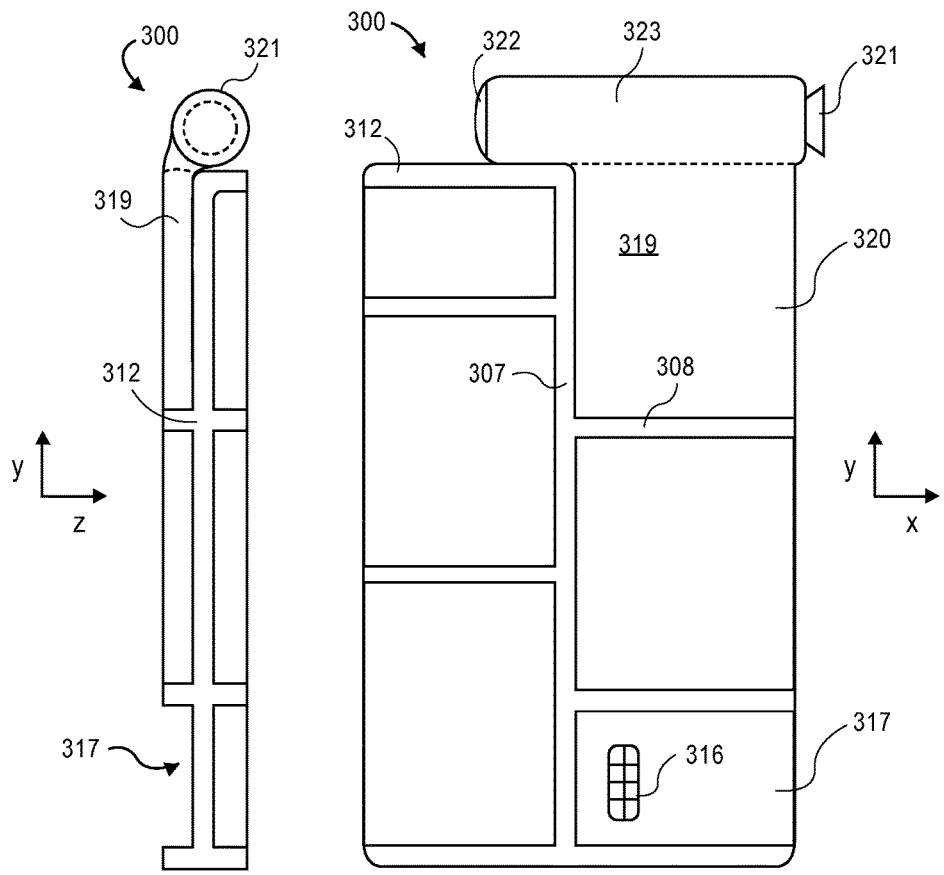
FIGS. 3A-3C depict different views of an example electronic with a modular imaging module secured thereto, in accordance with some embodiments.
Figure 3B:
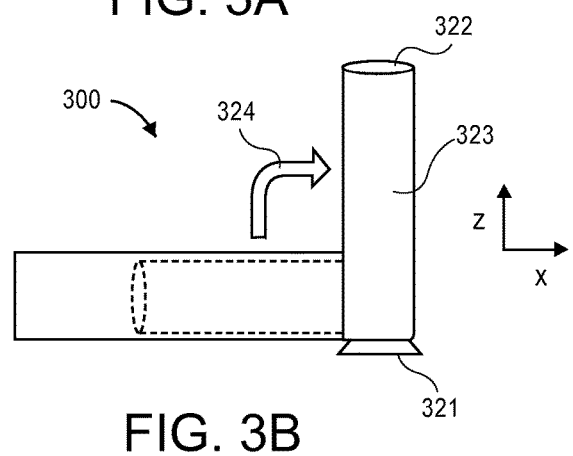

Referring to FIGS. 3A-3C, depicted are multiple views of an example modular electronic device 300 capable of supporting an imaging module according to the present embodiments. In particular, FIG. 3A depicts a front view of the electronic device 300, FIG. 3B depicts a top view of the electronic device 300, and FIG. 3C depicts a side view of the electronic device 300, where the electronic device 300 is defined by a set of dimensions: a width ("x") dimension, a height ("y") dimension, and a thickness ("z") dimension.

The electronic device 300 may include a support housing 312 defining a set of ports to which modules may removably secure via a set of associated connector components. The set of ports may be defined by a set of one or more horizontal "endoribs" 308, a set of one or more vertical "endospines" 307, and a center plate. Each of the set of ports may be empty or may have a module secured thereto. For example, as shown in FIG. 3A, the support housing 312 may include an empty port 317 (i.e., there is no module connected to the port 317) with an associated connector component 316. It should be appreciated that each of the modules and each of the set of ports may include different amounts, types, and sizes of connector components.

As depicted in FIG. 3A, the support housing 312 may support an imaging module 319 that may removably secure to one of the set of ports (as shown in FIG. 3A: the top right port) via one or more connector components. The imaging module 319 may include two sections: a support section 320 and a body section 323. The support section 320 may be sized to fit the corresponding port of the support housing 312, and may include one or more components configured to connect to the corresponding connector components of the electronic device 300.

The body section 323 extends outward from the support section 320 and accordingly extends beyond one or more of the dimensions of the electronic device 300. In particular, as illustrated in FIGS. 3A and 3C, the body section 323 extends above the top edge of the electronic device 300 and accordingly extends above the height ("y") dimension of the electronic device 300. Further, the body section 323 may itself have dimensions that are larger or smaller than the dimensions of the support section 320. In particular, as illustrated in FIG. 3A, the body section 323 may have a width ("x" dimension) that is greater than the width of the support section 320. Accordingly, the body section 323 may extend past the endospine 307 of the support housing 312 as well as the right edge of the support housing 312.

The body section 323 may be defined by a length extending from a first end to a second end opposite the first end. In some implementations, the first end of the body section 323 may include a lens 322 disposed at, near, or otherwise in proximity to the first end. Similarly, the second end of the body section 323 may include a viewfinder 321 disposed at, near, or otherwise in proximity to the second end. In operation, light may pass through the lens 322, which a user may view through the viewfinder 321. Effectively, what the user sees through the viewfinder 321 may represent what may be captured as a digital image, as conventionally understood.

The body section 323 may be configured to articulate, move, rotate, or otherwise reposition when the imaging module 319 is secured to the support housing 312. In one implementation, the imaging module 319 may include a rotation component (e.g., a hinge or other similar component) that enables the body section 323 to rotate at least partially about an axis. As depicted in FIG. 3B, the body section 323 has rotated about ninety (90) degrees about the "y" axis from its position in FIG. 3A, as indicated by arrow 324. In the position depicted in FIG. 3B, the body section 323 extends beyond the thickness ("z") dimension of the electronic device 300.

The body section 323 may itself have a thickness that is greater or less than the thickness of the electronic device 300. Referring to FIGS. 3A and 3C, the body section 323 is positioned as extended along the "x" dimension of the electronic device 300, where the thickness ("z") dimension of the body section 323 is less than the thickness of the electronic device 300. However, it should be appreciated that the body section 323 may extend past either or both of the front edge or the back edge of the electronic device 300.

It should be appreciated that the user may operate the imaging module 319 when the body section 323 is in any position, such as the position depicted in FIG. 3A, the position depicted in FIG. 3B, or another position. In some scenarios, the user may find that the imaging module 319 is easier to use in a certain position (e.g., the position depicted in FIG. 3B, as the user is able hold the front of the electronic device 300 and the lens 322 is free from any obstruction).

In one implementation, the imaging module 319 may activate in response to the body section 323 rotating to a particular position, where a processor of the electronic device 300 may detect rotation of the body section 323 and may accordingly activate the imaging module 319. For example, if the processor detects that the body section 323 has moved from the position depicted in FIG. 3A to the position depicted in FIG. 3B, then the processor may automatically activate the imaging module 319 and may also initiate a digital image capture application (e.g., a camera application) stored on the electronic device 300. Thus, the user may interface with the digital image capture application and the imaging module 319 to capture digital images and/or video.

Figures 4A, 4B:
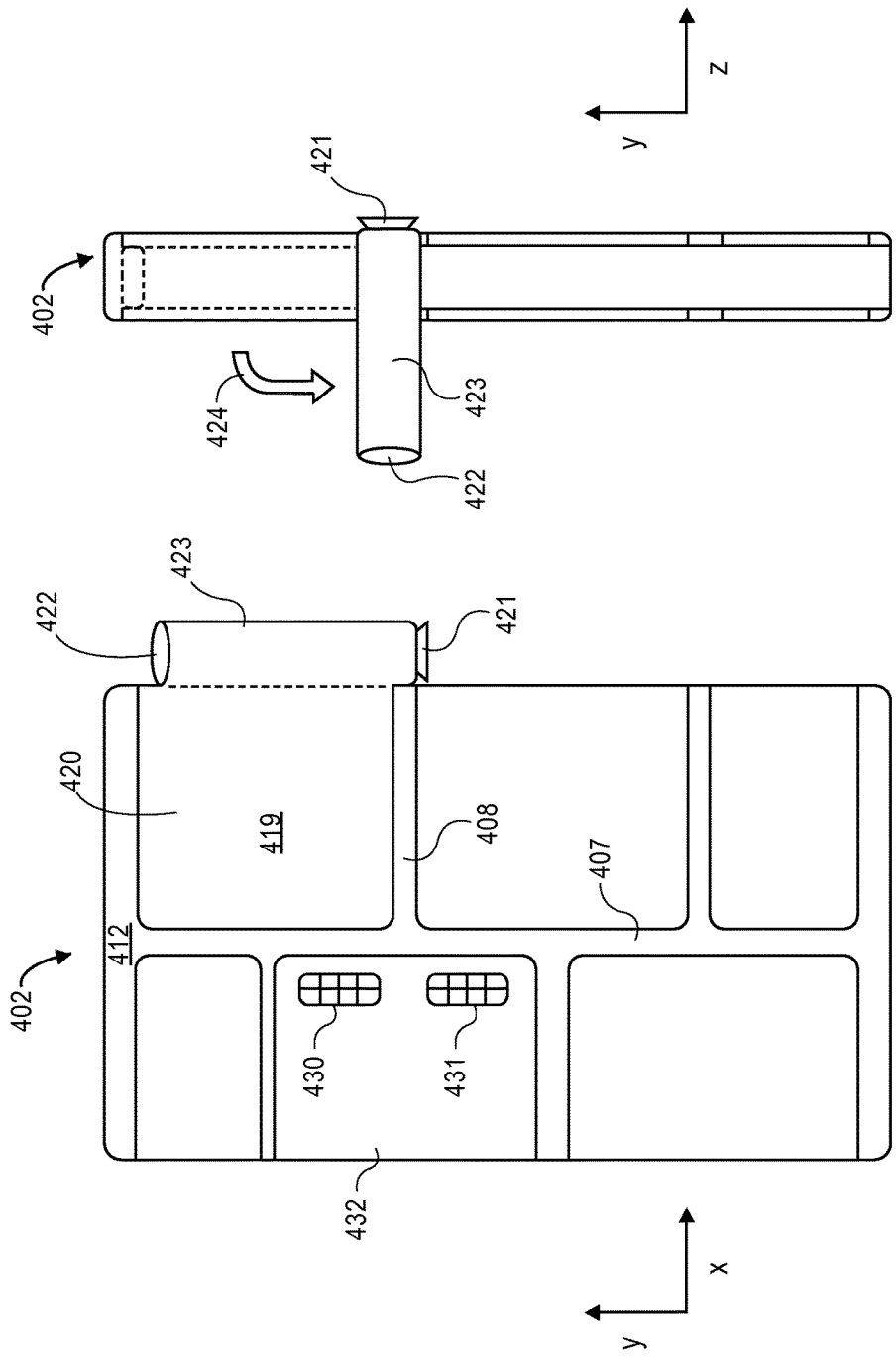
FIGS. 4A and 4B depict different views of an example electronic with a modular imaging module secured thereto, in accordance with some embodiments.

Referring to FIGS. 4A and 4B, depicted are respective views of another example modular electronic device 402 capable of supporting an imaging module according to the present embodiments. In particular, FIG. 4A depicts a front view of the electronic device 402 and FIG. 4B depicts a side view of the electronic device 402, where the electronic device 402 is defined by a set of dimensions: a width ("x") dimension, a height ("y") dimension, and a thickness ("z") dimension.

Similar to the electronic device 300 discussed with respect to FIGS. 3A and 3B, the electronic device 402 may include a support housing 412 defining a set of ports to which modules may removably secure via a set of associated connector components. The set of ports may be defined by a set of one or more horizontal "endoribs" 408, a set of one or more vertical "endospines" 407, and a center plate. Each of the set of ports may be empty or may have a module secured thereto. For example, as shown in FIG. 4A, the support housing 412 may include an empty port 432 (i.e., there is no module connected to the port 432) with associated connector components 430, 431.

The support housing 412 may support an imaging module 419 that may removably secure to one of the set of ports (as shown in FIG. 4A: the top right port) via one or more connector components. The imaging module 419 may include two sections: a support section 420 and a body section 423. The support section 420 may be sized to fit the corresponding port of the support housing 412, and may include one or more components configured to connect to the corresponding connector components of the electronic device 402.

The body section 423 extends outward from the support section 420 and accordingly extends beyond one or more of the dimensions of the electronic device 402. In particular, as illustrated in FIG. 4A, the body section 423 extends from the right edge of the electronic device 402 and accordingly extends beyond the width ("x") dimension of the electronic device 402. Further, the body section 423 may itself have dimensions that are larger or smaller than the dimensions of the support section 420. In particular, as illustrated in FIGS. 4A and 4B, the body section 423 may have a thickness that is greater than the thickness ("z") of the support section 420, and may have a length that is greater than the length ("y") of the support section 420.

The body section 423 may be defined by a length extending from a first end to a second end opposite the first end. In some implementations, the first end of the body section 423 may include a lens 422 disposed at, near, or otherwise in proximity to the first end. Similarly, the second end of the body section 423 may include a viewfinder 421 disposed at, near, or otherwise in proximity to the second end. In operation, light may pass through the lens 422, which a user may view through the viewfinder 421. Effectively, what the user sees through the viewfinder 421 may represent what may be captured as a digital image, as conventionally understood.

The body section 423 may be configured to articulate, move, rotate, or otherwise reposition when the imaging module 419 is secured to the support housing 412. In one implementation, the imaging module 419 may include a rotation component (e.g., a hinge or other similar component) that enables the body section 423 to rotate at least partially about an axis. As depicted in FIG. 4B, the body section 423 has rotated about ninety (90) degrees from its position in FIG. 4A, as indicated by arrow 424. In the position depicted in FIG. 4B, the body section 423 extends beyond the thickness ("z") dimension of the electronic device 402.

It should be appreciated that the user may operate the imaging module 419 when the body section 423 is in any position, such as the position depicted in FIG. 4A, the position depicted in FIG. 4B, or another position. In some scenarios, the user may find that the imaging module 419 is easier to use in a certain position (e.g., the position depicted in FIG. 4B, as the user is able hold the front of the electronic device 402 and the lens 422 is free from any obstruction).

In one implementation, the imaging module 419 may activate in response to the body section 423 rotating to a particular position, where a processor of the electronic device 402 may detect rotation of the body section 423 and may accordingly activate the imaging module 419. For example, if the processor detects that the body section 423 has moved from the position depicted in FIG. 4A to the position depicted in FIG. 4B, then the processor may automatically activate the imaging module 419 and may also initiate a digital image capture application (e.g., a camera application) stored on the electronic device 402. Thus, the user may interface with the digital image capture application and the imaging module 419 to capture digital images and/or video.

Figure 5:
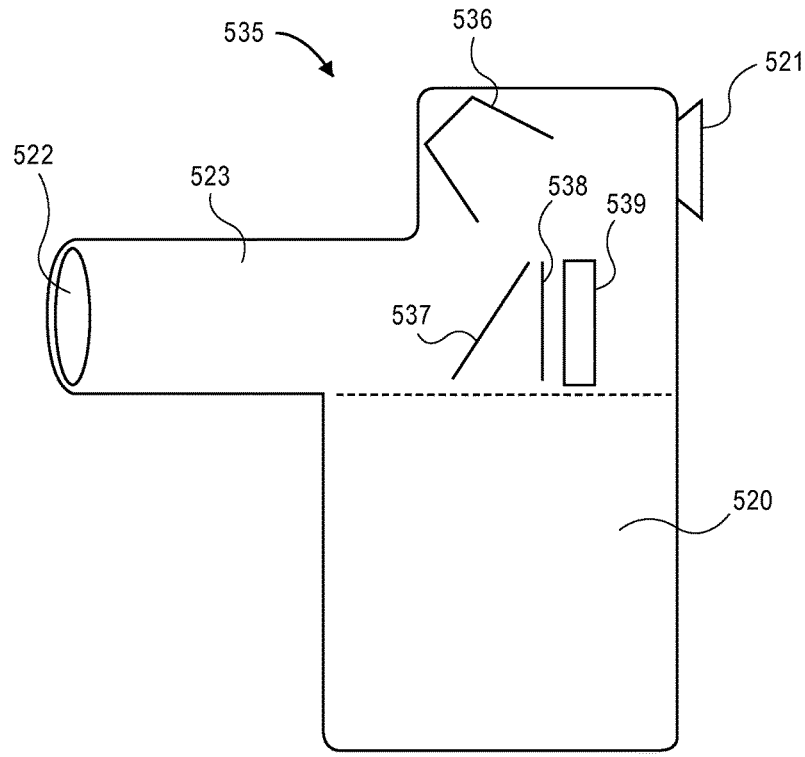
FIG. 5 depicts a cross-section view of an example imaging module, in accordance with some embodiments.

FIG. 5 depicts a cross-section view of an example imaging module 535 that may be configured to removably secure to a modular electronic device. Similar to the imaging modules 319, 419 described with respect to FIGS. 3A-3C, 4A, and 4B, the imaging module 535 may include a support section 520 configured to removably secure to a port of a support housing of the modular electronic device, and a body section 523 that may house or contain various components. The body section 523 may be defined by a length extending from a first end to a second end opposite the first end, where an optical viewfinder 521 may be disposed at, near, or otherwise in proximity to the second end.

As illustrated in FIG. 5, the body section 523 may house a lens 522, a mirror 537, and a pentaprism 536. In operation, light that passes through the lens 522 may reflect off the mirror 537 and into the pentaprism 536, which deviates the light to the optical viewfinder 521. Accordingly, by looking through the optical viewfinder 521, a user may effectively view the light that passes through the lens 522. In some implementations, the body section 523 may additionally house a set of individual lens elements (not depicted in FIG. 5) that may, in combination, be configured as a zoom lens and/or an autofocus lens that supports a range of corresponding focal lengths. Further, it should be appreciated that the lens 522 may be of or include various sizes, types, apertures, and/or other properties.

The body section 523 may also house a shutter 538 and an image sensor 539 that may be configured to capture digital image data. In embodiments, the image sensor 539 may be any type of image sensor, including CCD, CMOS, sCMOS, BSI-CMOS, or the like, having various properties. In particular, the image sensor 539 may support various aspect ratios, resolutions, sensitivities, field of view crop factors, depths of field, dynamic ranges, active areas, shading effects, color schemes (e.g., full color resolution or monochrome), and/or other technical specifications. The imaging module 535 (or another module of the corresponding modular electronic device, such as a display screen) may be configured with a hardware or software selection or switch that, upon selection, may cause the image sensor 539 to capture digital image data.

In operation, in response to the actuation of the selection or switch, a set of mechanical components may lift the mirror 537 and move or relocate the shutter 538 such that the image sensor 539 is exposed to the light that passes through the lens 522. Accordingly, the image sensor 539 may capture the corresponding digital image data. The image sensor 539 may also interface with a memory of the corresponding modular electronic device, where the image sensor 539 may transmit the captured digital image data to the memory for storage thereon. Although not depicted in FIG. 5, the imaging module 535 may further include a rotation component that enables the body section 523 to rotate at least partially about an axis, while the support section 520 may remain stationary. For example, the body section 523 may rotate in a circular manner with a range of motion that may vary from greater than zero degrees to 360 degrees.

Figure 6:
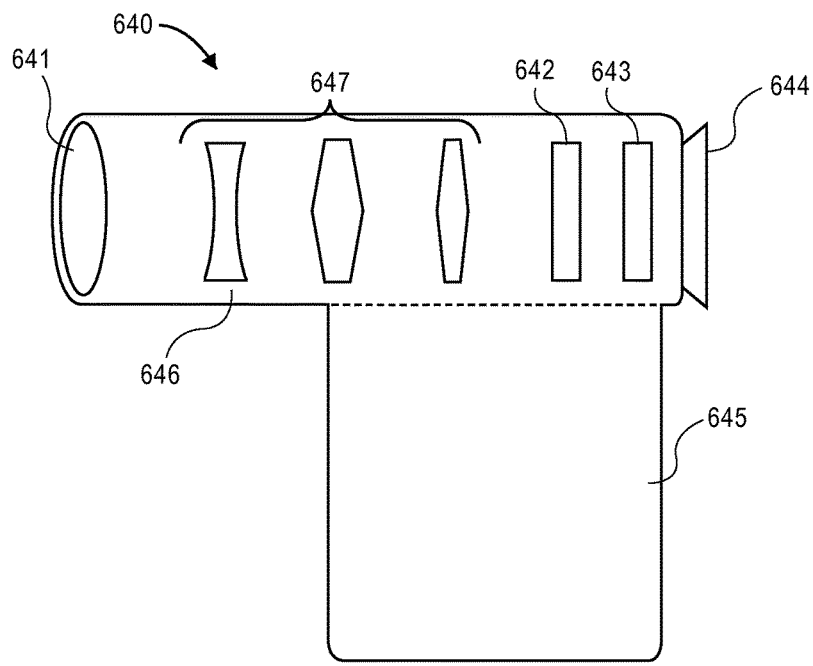
FIG. 6 depicts a cross-section view of another example imaging module, in accordance with some embodiments.

FIG. 6 depicts a cross-section view of another example imaging module 640 that may be configured to removably secure to a modular electronic device. Similar to the imaging module 535 described with respect to FIG. 5, the imaging module 640 may include a support section 645 configured to removably secure to a port of a support housing of the modular electronic device, and a body section 646 that may house or contain various components. The body section 646 may be defined by a length extending from a first end to a second end opposite the first end, where an electronic viewfinder 644 may be disposed at, near, or otherwise in proximity to the second end.

As illustrated in FIG. 6, the body section 646 may house a primary lens 641 and a set of individual lens elements 647 that may, in combination, be configured as a zoom lens that supports a range of corresponding focal lengths. It should be appreciated that the set of individual lens elements 647 are optional and that the body section 646 may solely include the primary lens 641. It should further be appreciated that the amount, type, and size of the set of individual lens elements 647 may vary, depending on the desired focal length, range of desired focal lengths, or other factors.

The body section 646 may also house an image sensor 642 and a display screen 643. As depicted in FIG. 6, the display screen 643 is disposed in proximity to the electronic viewfinder 644. In operation, light that passes through the primary lens 641 and the set of individual lens elements 647 may be recorded by the image sensor 642 as digital image data. The display screen 643 may interface with the image sensor 642 and display the digital image that is recorded by the image sensor 642. Accordingly, by looking through the electronic viewfinder 644, a user may view the display screen 643 which may display the digital image data recorded by the image sensor 642.

In embodiments, the image sensor 642 may be any type of image sensor, including CCD, CMOS, sCMOS, BSI- CMOS, or the like. The imaging module 640 (or another module of the corresponding modular electronic device, such as a display screen) may be configured with a hardware or software selection or switch that, upon selection, may cause the image sensor 642 to capture digital image data. In some implementations, the image sensor 642 may be configured with an electronic shutter that, in controlling a shutter speed, may set how long the image sensor 642 records the detected light. Accordingly, the image sensor 642 may record digital image data at various shutter speeds without the need for a manual shutter, such as the shutter 538 as described with respect to FIG. 5.

The image sensor 642 may also interface with a memory of the corresponding modular electronic device, where the image sensor 642 may transmit the captured digital image data to the memory for storage thereon. Although not depicted in FIG. 6, the imaging module 640 may further include a rotation component that enables the body section 646 to rotate at least partially about an axis. For example, the body section 646 may rotate in a circular manner with a range of motion that may vary from greater than zero degrees to 360 degrees.

Figure 7:
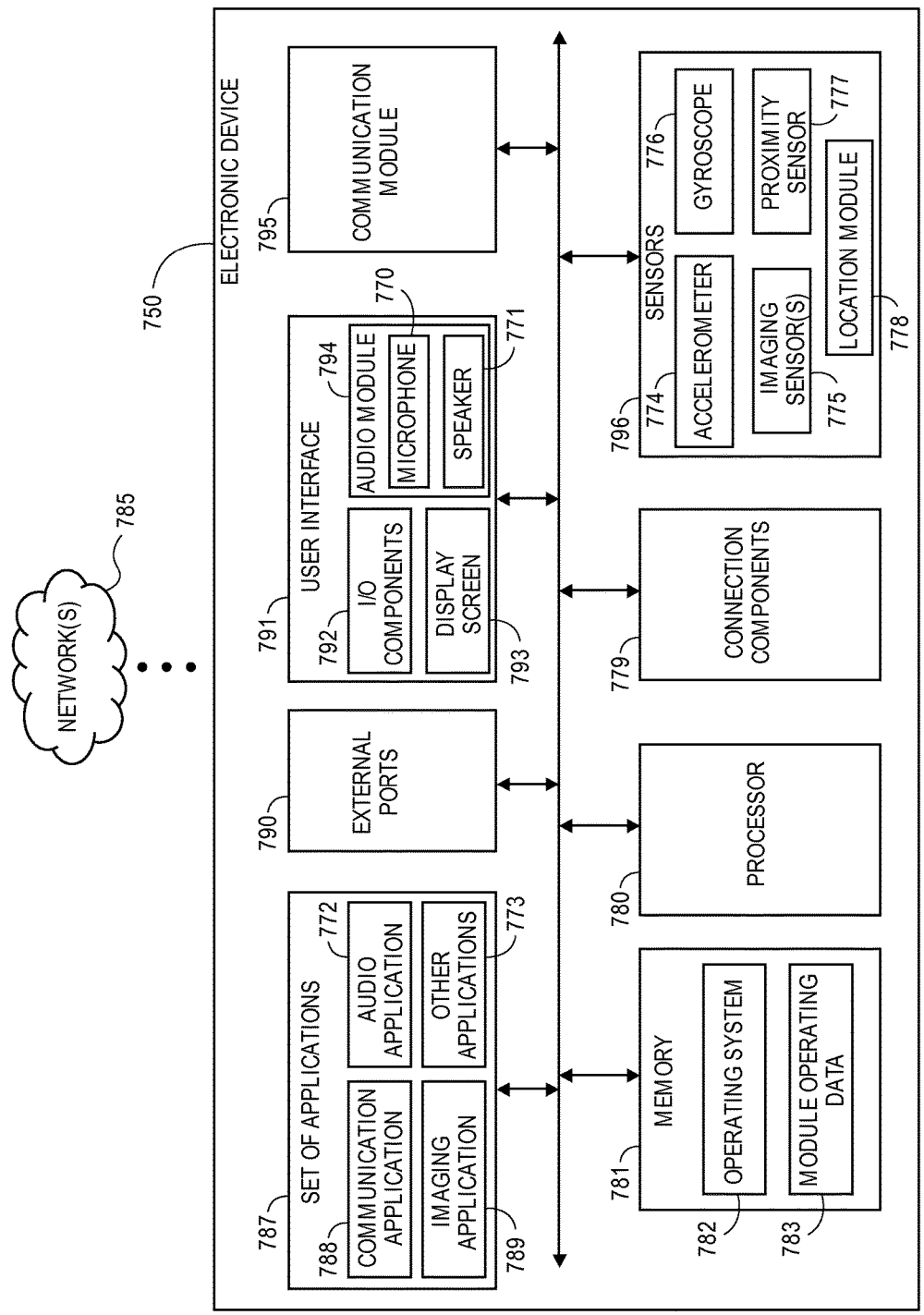
FIG. 7 is a block diagram of an electronic device in accordance with some embodiments.

FIG. 7 illustrates an example electronic device 750 (such as the electronic device 10 discussed with respect to FIG. 2A, or other devices) in which the functionalities as discussed may be implemented. The electronic device 750 may include a processor 780 or other similar type of controller module or microcontroller, as well as a memory 781. The processor 780 may include a singular processor or may include more than one separate processor such as: an application processor to manage a set of applications 787 and a user interface 791 of the electronic device 750, a sensor processor to manage sensor 796 data, and an audio processor to process audio 794 data.

The memory 781 may store an operating system 782 capable of facilitating the functionalities discussed. The processor 780 may interface with the memory 781 to execute the operating system 782 and the set of applications 787. The set of applications 787 (which the memory 781 may also store) may include a communications application 788 configured to facilitate various communications, an imaging application 789 configured to capture digital image and video data, and an audio application 772 configured to manage audio playback. The set of applications 787 may also include one or more other applications 773 such as, for example, music and entertainment applications, phone applications, messaging applications, calendar applications, social networking applications, utilities, productivity applications, games, travel applications, communication application, shopping applications, finance applications, sports applications, photography applications, mapping applications, weather applications, applications for connecting to an online marketplace, and/or other applications.

The memory 781 may further store module operating data 783 that indicates various information associated with modules and functions/applications corresponding thereto. Generally, the memory 781 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The electronic device 750 may further include a communication module 795 configured to interface with one or more external ports 790 to communicate data via one or more wired or wireless networks 785. For example, the communication module 795 may leverage the external ports 790 to establish a wide area network for connecting the electronic device 750 to other components such as a remote data server. According to some embodiments, the communication module 795 may include one or more transceivers functioning in accordance with IEEE standards, 3GPP standards, or other standards, and configured to receive and transmit data via the one or more external ports 790. More particularly, the communication module 795 may include one or more WWAN, WLAN, and/or WPAN transceivers configured to connect the electronic device 750 to wide area networks, local area networks, and/or personal area networks.

The electronic device 750 may further include one or more sensors 796 such as one or more accelerometers 774, gyroscopes 776, imaging sensors 775, proximity sensors 777, and one or more location modules 778. The sensors 796 may also include other types of sensors such as light sensors, infrared sensors, touch sensors, NFC components, and other sensors. The electronic device 750 may further include a user interface 791 configured to present information to the user and/or receive inputs from the user. As illustrated in FIG. 7, the user interface 791 may include a display screen 793 and I/O components 792 (e.g., capacitive or resistive touch sensitive input panels, keys, buttons, lights, LEDs, cursor control devices, haptic devices, and others).

In embodiments, the display screen 793 may be a touch-screen display using singular or combinations of display technologies and can include a thin, transparent touch sensor component superimposed upon a display section that is viewable by a user. For example, such displays include capacitive displays, resistive displays, surface acoustic wave (SAW) displays, optical imaging displays, and the like. The user interface 791 may further include an audio module 794 including hardware components such as one or more speakers 771 for outputting audio data and one or more microphones 770 for detecting or receiving audio.

According to embodiments, the components of the user interface 791 may be embodied in hardware modules that may connect to the electronic device 750. For example, the imaging sensor(s) 775 may be part of an imaging module that connects to the electronic device 750. Similarly, the hardware modules may include one or more of the set of sensors 796, as well as hardware that contributes to operation of the processor 780, to capacity or operation of the memory 781, or to functionality of the communication module 795 and/or the external ports 790. The hardware modules may connect to the electronic device 750 via a set of connection components 779 that may be part of a support housing of the electronic device 750.

In general, a computer program product in accordance with an embodiment includes a computer usable storage medium (e.g., standard random access memory (RAM), an optical disc, a universal serial bus (USB) drive, or the like) having computer-readable program code embodied therein, wherein the computer-readable program code is adapted to be executed by the processor 780 (e.g., working in connection with the operating system 782) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML, and/or others).

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

What is claimed is:

1. An electronic device comprising:
    a support housing defined by a set of dimensions including a thickness dimension, and comprising (i) a center plate, (ii) a set of ribs protruding from the center plate, and (iii) a set of spines protruding from the center plate and arranged perpendicular to the set of ribs, wherein the thickness dimension of the support housing is defined by the center plate and at least one of the set of ribs and the set of spines;
    a memory storing a set of computer-executable instructions;
    an imaging module configured to removably secure to the support housing via a connector component of the electronic device, the imaging module comprising:
        a support section configured to secure to the support housing such that when the support section is secured to the support housing, (i) the support section fits within at least a portion of the set of ribs and the set of spines, and (ii) the support section does not extend past the thickness dimension of the support housing,
        a body section defined by a length extending from a first end to a second end opposite the first end, the body section extending beyond at least one of the set of dimensions of the support housing, and housing:
            a primary lens at least partially disposed near the first end of the body section,
            a viewfinder disposed near the second end of the body section opposite the first end, and
            at least one additional lens disposed between the primary lens and the viewfinder,
        a rotation component that enables the length of the body section to rotate at least partially about an axis, and
        an image sensor configured to record digital image data according to light that passes through the primary lens and the at least one additional lens of the body section; and
    a processor interfacing with the memory, and configured to execute the set of computer-executable instructions to cause the processor to:
        detect that the body section is rotated at least partially about the axis, wherein when the body section is rotated at least partially about the axis, the body section extends beyond at least two of the set of dimensions of the support housing, and
        in response to the detecting, activate the imaging module.

2. The electronic device of claim 1, wherein the viewfinder is an electronic viewfinder comprising a display screen configured to display the digital image data recorded by the image sensor.

3. The electronic device of claim 1, wherein the viewfinder is an optical viewfinder configured to enable a user to view the light that passes through the primary lens and the at least one additional lens of the body section.

4. The electronic device of claim 1, wherein the set of dimensions comprises a width dimension, a height dimension, and the thickness dimension, and wherein the body section extends beyond at least one of the width dimension, the height dimension, and the thickness dimension.

5. The electronic device of claim 1, wherein the body section further houses the image sensor.

6. An imaging module configured to removably secure to an electronic device, comprising:
    a support section configured to secure to a support housing of the electronic device, the support housing defined by a set of dimensions including a thickness dimension, and comprising (i) a center plate, (ii) a set of ribs protruding from the center plate, and (iii) a set of spines protruding from the center plate and arranged perpendicular to the set of ribs, wherein the thickness dimension of the support housing is defined by the center plate and at least one of the set of ribs and the set of spines, wherein a port is defined by at least a portion of the set of ribs and the set of spines, and wherein when the support section is secured to the support housing, (i) the support section fits within at least the portion of the set of ribs and the set of spines, and (ii) the support section does not extend past the thickness dimension of the support housing;
    a body section defined by a length extending from a first end to a second end opposite the first end, the body section extending from the support section and extending beyond at least one of the set of dimensions of the support housing when the support section is secured to the support housing, the body section housing:
        a primary lens at least partially disposed near the first end of the body section,
        a viewfinder disposed near the second end of the body section opposite the first end, and
        at least one additional lens disposed between the primary lens and the viewfinder;
    a rotation component that enables the length of the body section to rotate at least partially about an axis; and
    an image sensor configured to record digital image data according to light that passes through the primary lens and the at least one additional lens of the body section.

7. The imaging module of claim 6, wherein the viewfinder is an electronic viewfinder comprising a display screen configured to display the digital image data recorded by the image sensor.

8. The imaging module claim 6, wherein the viewfinder is an optical viewfinder configured to enable a user to view the light that passes through the primary lens and the at least one additional lens of the body section.

9. The imaging module claim 6, wherein the body section further houses the image sensor.

10. An electronic device configured for digital image capture, comprising:
    a memory;
    a support housing defined by a set of dimensions including a thickness dimension, and comprising (i) a center plate, (ii) a set of ribs protruding from the center plate, and (iii) a set of spines protruding from the center plate and arranged perpendicular to the set of ribs, wherein the thickness dimension of the support housing is defined by the center plate and at least one of the set of ribs and the set of spines, wherein a port is defined by at least a portion of the set of ribs and the set of spines; and an imaging module comprising:
- a support section configured to secure to the support housing via the port, wherein when the support section is secured to the support housing, (i) the support section fits within at least the portion of the set of ribs and the set of spines, and (ii) the support section does not extend past the thickness dimension of the support housing,
- a body section defined by a length extending from a first end to a second end opposite the first end, the body section extending from the support section and extending beyond at least one of the set of dimensions of the support housing, the body section housing:
  - a primary lens at least partially disposed near the first end of the body section,
  - a viewfinder disposed near the second end of the body section opposite the first end, and
  - at least one additional lens disposed between the primary lens and the viewfinder,
- a rotation component that enables the length of the body section to rotate at least partially about an axis, and
- an image sensor configured to record digital image data according to light that passes through the primary lens and the at least one additional lens of the body section, the memory configured to store the digital image data.

11. The electronic device of claim 10, wherein the viewfinder is one of: (i) an electronic viewfinder comprising a display screen configured to display the digital image data recorded by the image sensor, or (ii) an optical viewfinder configured to enable a user to view the light that passes through the lens of the body section.

12. The electronic device of claim 10, wherein the memory stores a set of computer-executable instructions, and wherein the electronic device further comprises:
- a processor interfacing with the memory, and configured to execute the set of computer-executable instructions to cause the processor to:
  - detect an activation of an image capture selection,
  - responsive to detecting the activation, cause the image sensor to record the digital image data, and
  - transmit the digital image data to the memory for storage thereon.

* * * * *